Feb. 2, 1954   N. C. PRICE   2,668,026
ORIENTABLE JET-PROPULSION SYSTEM FOR AIRCRAFT
Filed Oct. 12, 1949   4 Sheets-Sheet 1
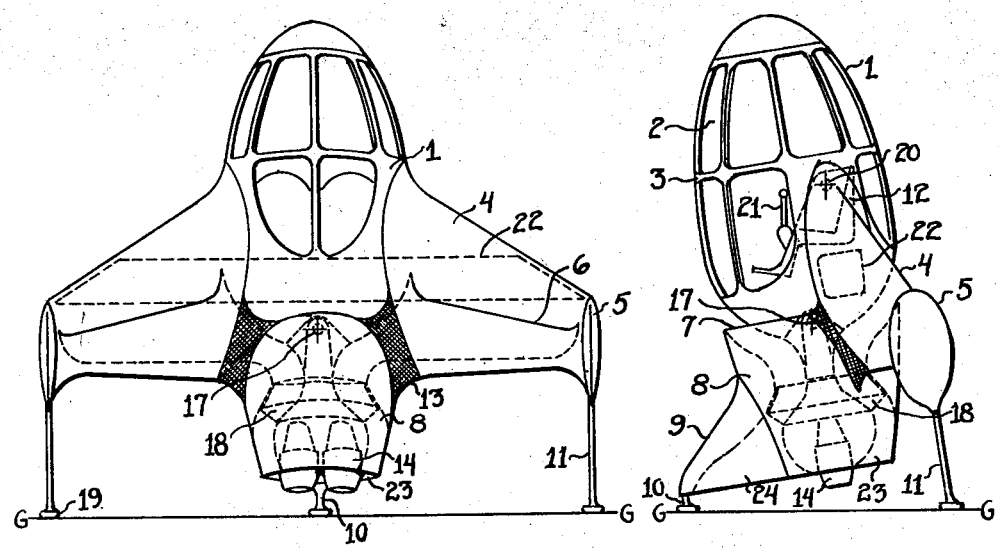
FIG-1-   FIG-2-
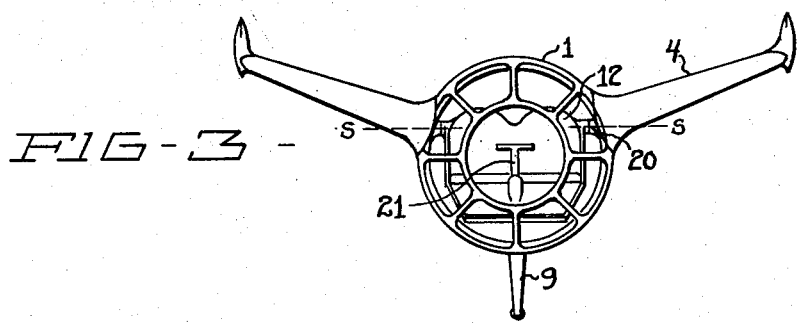
FIG-3-
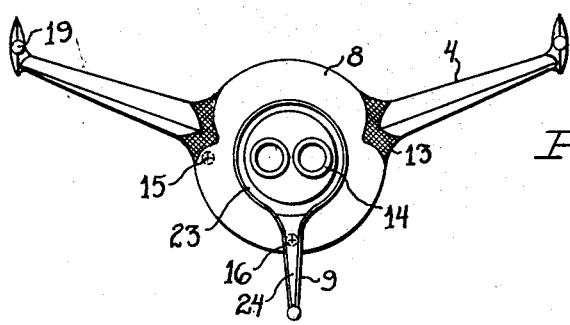
FIG-4-
INVENTOR
Nathan C. Price Feb. 2, 1954
N. C. PRICE
2,668,026
ORIENTABLE JET-PROPULSION SYSTEM FOR AIRCRAFT
Filed Oct. 12, 1949
4 Sheets-Sheet 3
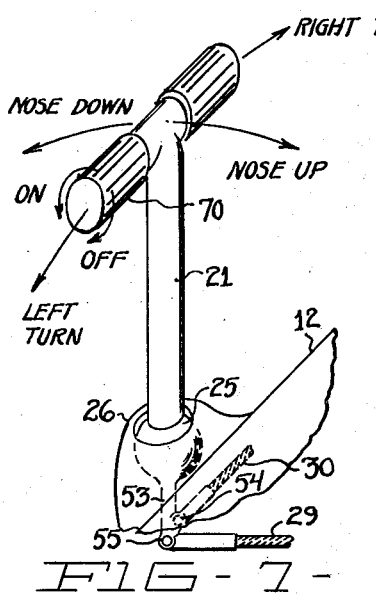
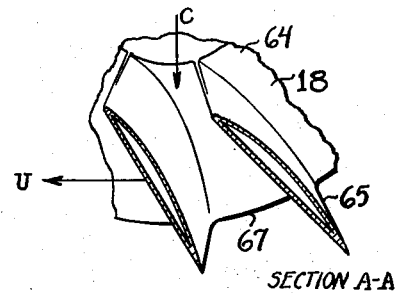
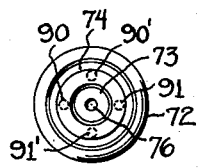
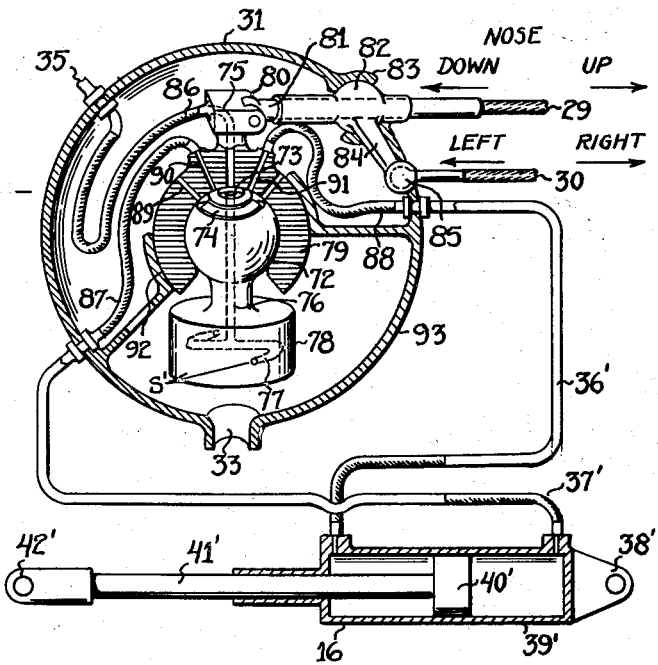
INVENTOR

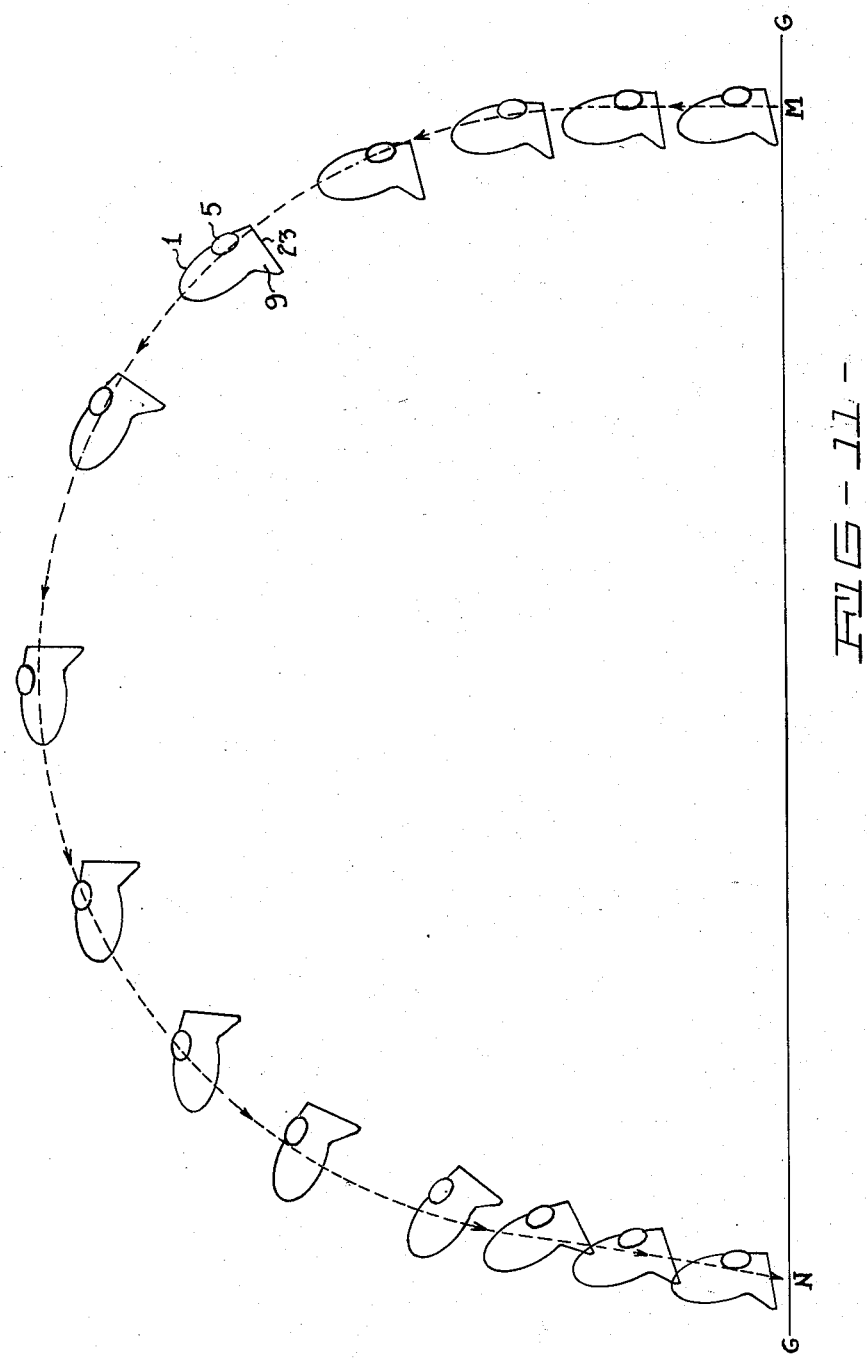

Patented Feb. 2, 1954

2,668,026

UNITED STATES PATENT OFFICE 2,668,026

ORIENTABLE JET-PROPULSION SYSTEM
FOR AIRCRAFT

Nathan C. Price, St. Helena, Calif., assignor to
Lockheed Aircraft Corporation, Burbank, Calif.

Application October 12, 1949, Serial No. 120,918

8 Claims. (Cl. 244—52)

The present invention relates to a mechanism for directional control and propulsion of carrier devices or vehicles intended to operate above the surface of the ground. More specifically the invention pertains to propulsion of small aircraft which are to be used by families or individuals. Such aircraft must be capable of operation from very small landing areas, and it is essential that these aircraft be superior from both time-saving and operational cost standpoints, compared to automobiles, for distances ranging from a few miles up to several hundred miles.

It is accordingly an objective of the invention to make vertical rising and landing of the aircraft possible, combined with ability to attain a relatively high speed in level flight.

It is furthermore an objective to furnish apparatus capable of economical operation over long distances, which involves a primary structure of low weight. The volumetric capacity and pay load of the aircraft are to be relatively large.

It is an object of the invention to provide fully adequate passenger comfort and maximum visibility for the pilot.

A highly important objective of the invention is to provide safety of operation, through automatic directional control subject to manual adjustment, to reach any desired landing area. This objective also includes the provision of inherent features, to act in the event of power failure of one or both of the engines.

It is an objective to insure stability and effective directional control, notwithstanding the utilization of very short fuselage length and limited wing span, the latter characteristics reducing the parking or storage space requirements to a minimum.

It is an objective to provide a selectively directional propulsive mechanism of utmost simplicity and low initial cost, which is practical to place in large scale manufacturing production.

It is furthermore an object of the invention to furnish propulsive mechanism arranged to avoid damage of any part of the aircraft primary structure should a violent failure or fire occur in one of the engines. Likewise utmost protection is to be provided to occupants of the aircraft in the event of a crash landing.

These and other objects and features of novelty will become evident hereinafter in the description, which, together with the following drawings illustrate preferred embodiments of the invention.

Figure 1 illustrates a typical utilization of the propulsive system of the invention, with the aircraft parked on the ground, viewed from the back side.

Figure 2 illustrates the aircraft of Figure 1, at rest on the ground, viewed from the left side.

Figure 3 shows the subject aircraft in level flight, viewed from the front.

Figure 4 shows the aircraft of Figure 1 in level flight, viewed from the rear.

Figure 6 is a fragmentary section of the impeller vanes and rotor of a ducted compressor of Figure 5.

Figure 7 is a perspective view of the manual control column shown in Figures 2, 3, and 5.

Figure 8 is a partial vertical section along the major axis of the aircraft, of a gyroscopic or gyro control unit forming part of the propulsive system of the invention.

Figure 9 is a plan view of a gyro rotor utilized in the gyro control unit of Figure 8.

Figure 10 is a partially cutaway section of one of the several resilient pads upon which the subject aircraft may be brought to rest, as shown in Figure 1.

Figure 11 is a schematic representation of the attitudes which the aircraft utilizing the propulsive system of the invention will customarily assume in undertaking a typical flight.

Referring now to the drawings in which like reference numerals refer to corresponding parts throughout the several figures, the apparatus of the invention is as follows:

Figure 5:
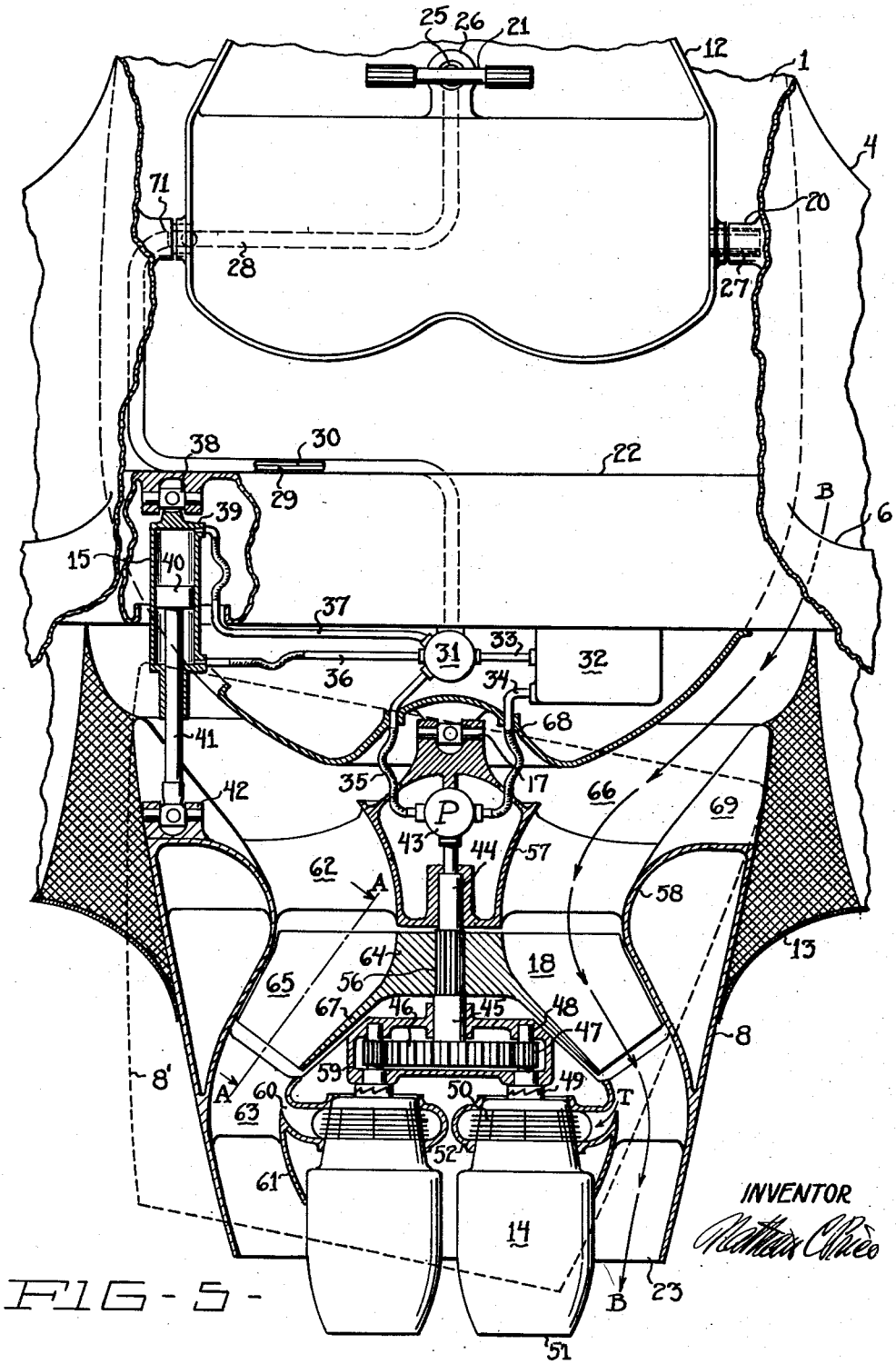
Figure 5 is a partially cutaway section of the rear portion of the subject aircraft, along the major axis of the aircraft, showing the detailed arrangement of the propulsive system.

The general arrangement of the apparatus associated with this invention is best shown in Figures 1 and 2, in which the aircraft is shown parked on the ground surface G—G before taking off or after landing, and in Figures 3 and 4, in which the aircraft is shown in level flight. In the ensuing description of the invention, relative positions of parts refer to the normal level flight attitude of the aircraft, during which the major axis of the cabin is approximately parallel to the ground surface.

An ellipsoidal cabin I is articulated at the rear end to an empennage 8, or tail assembly, by a universal joint 17 lying along the major axis of the cabin. The directional control of the aircraft is achieved by regulation of the angle of the empennage 8 with respect to the cabin, subject to manually adjustable gyro servo controls of the hydraulic type, to be later described.

Backswept wings 4, shown in Figures 3 and 4 to possess a strong dihedral extend from the sides of the cabin. The cabin structure is primarily composed of a plurality of plastic windows 2 secured in a relatively narrow framework 3 except for the solid portions of formed sheet Duralumin where the wings 4 and empennage 8 are confronted, and contains a two-place seat 12 suspended as a pendulum by pivots 20 along a transverse axis S—S approximately opposite the foremost junction of the wings to the cabin.

Since the seat 12 is journalled at its upper sides, it tends to remain in vertical position, even though the attitude of the aircraft varies from the normal takeoff or landing position with the empennage down, to positions of level flight, or in certain cases of rapid descent with the empennage of the aircraft upward. A manual control column 21 is located at the middle of the seats and moves together with the seats.

A box spar 22 extends transversely behind the seat 12 to form the major structure for withstanding bending forces imposed on the wings during flight while torsion is primarily absorbed in the solid portion of the cabin. The spar 22 extends spanwise within the wings to a region near tip shields 5, or elliptical plates, at the ends of the wings.

The empennage 8 has the shape of a truncated cone, the smaller diameter of which is to the rear, and from the lower side of which projects a vertical stabilizer 9. The outer free end of the stabilizer 9 and the rear ends of the tip shields 5 define a triangle transverse to the major axis of the aircraft, the center of which lies approximately beneath the center of mass of the aircraft when in ground position. Accordingly a strut 10 extending rearwardly from the outer free end of the stabilizer 9, and struts 11 extending rearwardly from each of the tip shields 5 suffice to provide stable support for the aircraft on the ground, yet maintaining an adequate distance between the rear end of the empennage and the ground for the egress of a lifting or propulsive jet of air. The struts 10 and 11 terminate in resilient pads 19 for ground contact, and these struts may also contain any pneumatic-hydraulic cushioning devices customary to the practices of aircraft landing gear construction, though such are not shown in the accompanying drawings.

A ducted compressor 18 of the mixed flow type is coaxially and rotatably supported within the empennage 5, deriving its inlet air from an annular boundary layer slot 7 defined by the rear end of the cabin and the front end of the empennage, and also from spanwise boundary layer slots 6 in the upper surface of each of the wings. In order to seal the spaces between the rear portions of the wings and the sides of the empennage to insure proper distribution of the air flow entering the ducted compressor 18, wing fillets 13 of flexible rubberized fabric, sliding sheets, or the like, are furnished permitting directional control movement of the empennage with respect to the remainder of the aircraft.

Engines 14, preferably of the gas turbine type, are located within the empennage behind the ducted compressor 18. These engines are ordinarily of cylindrical shape, with their axes parallel to and spaced on either side of the axis of the empennage, and furnish power to drive the ducted compressor. The location of the engines is such that a violent mechanical failure or fire arising in the engine compartment will not endanger the primary structure of the aircraft.

The delivery air from the ducted compressor 5 passes within the confines of the empennage 8 around the outside of engines 14 to issue as a propulsive jet from a nozzle 23, causing the aircraft to lift from the ground, or to be retarded when approaching the ground. Under conditions of level flight this ejected air provides the thrust to overcome drag of the aircraft. The stabilizer 9 is hollow and open to the rear forming an auxiliary jet nozzle 24 furnished air from the ducted compressor 5.

For the purposes of directional control the jet-producing empennage is adjusted in angle with respect to the cabin, by a servo hydraulic cylinder 15 for lateral movement, and by a servo hydraulic cylinder 16 for vertical movement, the approximate location of the aforesaid cylinders being indicated in Figure 4.

Thus, referring to Figure 5, directional control to the left side, for example, causing a left turn in level flight, or causing the cabin to remain approximately vertical and over a certain landing spot when the airplane is about to land in a side wind, is indicated by the dotted outline 8' of the empennage. The latter condition may occur if a gust of wind should strike the side of the airplane while the airplane is a short distance from the ground, during which the stabilizing control exerted from a gyro unit 31 mounted on the rear side of the spar 22, acts upon the cylinder 15 and upon the hydraulic servo portion of the invention, as will be described later. A voluntary directional control, may be attained by the pilot pushing the manual control column 21 thereby adjusting the gyro unit 31, to re-direct the aircraft anew. However, there is an inherent action in the event that the airplane tends to change attitude from the position already established at the control column 21 which takes place automatically in the gyro unit 31. This is of considerable importance during the takeoff or landing attitude of the aircraft, since the pilot then merely sets the control column in vertical position, causing the gyro unit 31 to maintain the aircraft in vertical position with the empennage downward.

Before progressing into the description of further details of the invention a discussion of some of the attainable characteristics is essential, with respect to the whole combination.

The ellipsoidal shape of the cabin 1 has been found to best satisfy the requirement of mechanical clearance for the pendulum type of seat 12, consistent with low aerodynamic drag up to speeds in excess of 300 miles per hour in level flight, and this shape is least affected by sudden gusts of wind, reducing the effort of correction which must be produced by the gyro unit 31 controlling the angle of the empennage and air jet issuing therefrom.

The wings 4 are preferably of the thick airfoil type, the thickness generally being at least 20 per cent of the chord, which, in combination with the boundary layer slots 6 undergoing suction from the ducted compressor 18, permits a wing loading in excess of 50 pounds per square foot of wing area. Very high angles of incidence can occur without stalling of flow over these wings.

Accordingly it has been found that a two-place airplane, as described, measures only 15 feet in wing span and 13 feet in overall length, with a gross weight of approximately 1600 pounds. Utilizing a weight flow of approximately 150 pounds of air per second through the ducted compressor, at comparatively low ratio of compression, the aircraft can accelerate vertically from the ground at 16 feet per second per second with one engine operating at full power.

The backsweep of the wings 4 assists directional stability in level flight, while the dihedral of the wings and the provision of the vertical stabilizer 5 on the under side of the empennage 8 assists in lateral stability, also causing proper banking when making turns, although no ailerons are provided. It will be apparent that as the empennage 8 is caused to assume a non-coaxial control angle with respect to the cabin 8, subject to regulation of the gyro unit 31, with or without manual adjustment from the control column 21, the boundary layer slots 6 and 7 no longer obtain a balanced flow, from side to side, or from top to bottom, as the case may be.

This unbalance in flow serves to impose a strong directional control on the aircraft by suction differentials acting on surfaces near the boundary layer slots, in conjunction with the directional control already exerted by the angle of the jet stream issuing from the empennage 8, which exerts a force or moment steering the airplane in any desired direction. The tip shields 5 assist in maintaining directional stability particularly in the event of complete engine failure, and furthermore reduce spill-over losses at the tips of the comparatively short wings.

An important reason for providing control movement of the complete empennage assembly including engines and the ducted compressor, rather than simply deflecting the air jet by shutters, vanes, or the like, is that the gyroscopic reluctance of the revolving parts of the engines and ducted compressor to change angle of their axes causes an added moment or force to be imposed on the forward portions of the aircraft, when the gyro controlled hydraulic servo system must adjust the position of the latter. This is of particular value when the aircraft is slowly approaching the ground to make a landing, contributing to the positiveness of control of the vertical attitude of the aircraft.

Referring now to Figure 5 illustrating one preferred form of details of the invention, the passenger seat 12 is supported by pins 27 in the pivots 20 allowing the seat to remain upright regardless of the attitude of the aircraft, which is mandatory for passenger comfort and visibility. If the engines should both fail directly after takeoff the aircraft will drop to the ground with empennage downward, thereby saving passengers from injury, due to the crash energy absorbing capability of the empennage structure. At a greater altitude it will be possible for the pilot to lower the nose of the aircraft, or the airplane will nose down inherently after stalling, to glide to a safe "belly" landing.

It will be noted that the seat 12 will swing feet forward under the latter condition as soon as ground contact is established, yielding the utmost protection to passengers under this emergency crash condition.

It is obvious that any customary form of damper mechanism, such as frictional or hydraulic dampers may be employed to act upon the seat 12 relative to the fuselage 1, to surpress cyclical swinging, should this tend to occur at any time, although such mechanism is not shown in the drawing, since adequate damping effect will generally be provided by inherent friction at the pins 27.

The control column 21 is movable about a ball pivot 25 cooperating with a stationary socket 26 attached to the seat 12. Referring to Figure 7, the column 21 must be pushed forward to lower the nose of the aircraft and pulled back to raise the nose, while the nose of the aircraft can be directed to the right or left, respectively, by right or left hand motion being applied to the column 21. The regulation of engine power or thrust to the aircraft will generally be accomplished by rotatable hand grips 70 at the upper end of the column 21, similar to the method customarily employed on motorcycle handlebars, in which the control motion of the hand grip is transmitted to the engine throttle.

The longitudinal and side manual motions of the column 21 are transmitted to push-pull control cables 29 and 30, respectively, through pin joints 55 and 54, at the free end of a lever 53 extending from the side of the ball pivot 25 opposite to that of the column 21. Referring to Figure 5, the cables 29 and 30 extend to the gyro unit 31 through a conduit 28 which has a rotative joint 71 opposite to one of the seat pivots 20 through which the conduit 28 extends.

Manual settings of the column 21 are thereby signalled to the gyro unit 31, effecting adjustment thereof irrespective of the position of the seat 12 relative to the fuselage 1.

The ducted compressor 18 includes a plurality of airfoil vanes 65 and a hub 64 which rearwardly flares as conical backplate 67 to which the vanes 65 are attached, said hub being rotatably supported by a compressor shaft 56 in a front journal bearing 44 and in a rear journal bearing 45.

The bearing 44 is built in the rear end of a hollow hub 57 which is secured at the front end to the universal joint 17, in turn supported in a rigid pocket 68 at the rear end of the cabin 1. The hub 57 houses an hydraulic pump 43 driven from the front end of the shaft 56, and serves as an attachment for a plurality of radial webs 62, or guide vanes, traversing an annular inwardly directed suction passage 66 for air, to flow between the empennage 8 and the cabin 1. The webs 62 join a Venturi-shaped shroud 58 of the empennage 8, the forward portion of which is indented by lateral slots 69 permitting additional flow space for air from the wing boundary layer slots 6 to enter the compressor. The rear portion of the shroud 58 forming a part of the empennage 8 proper, is furnished with inwardly directed outlet webs 63, or discharge guide vanes of the compressor, supporting an island 61 at the front end of which is a reduction gear box 59 carrying the bearing 45. The engines 14 are located in the rear portion of the island 61 with their principal axes parallel to the shaft 56. Exhaust gas outlets 51 of the engines 14 face toward the rear to assist in jet propulsive effort.

The front end of each engine is provided with an overrunning clutch 49 associated with drive spur pinions 47 in the box 59. The pinions 47 transmit power from the engines 14 to a gear 46 secured to the rear end of the shaft 56, and are journalled in the box by bearings 48.

The island 61 forms a streamlined inner boundary for air leaving the compressor 18. The surface of the island 61 is furnished with slots 60 for extraction of boundary air for combustion in the engines, said air entering volute-shaped shrouds 52 surrounding annular air inlets 50 of the engines 14. Since the compressor 18 is of the mixed flow or partially radial flow type, the action of the boundary air removal slots 60 assists in turning the compressor discharge air over the island 61 in an axial direction, to issue from the nozzle 23 as a more efficient propulsive jet. The course of propulsive jet air is indicated by arrows B—B while the flow direction of the engine combustion air is indicated by the arrow T.

Figure 6, a section of Figure 5 along the dotted line A—A illustrates the rearwardly turned vanes 65 composed of high speed airfoils, the free velocity of entering air being shown by the arrow C and the direction of vane rotation being indicated by the arrow U. One specific advantage of this mixed flow, or radial-axial flow airfoil vane, which is backwardly turned, is that broad characteristics are obtained over a wide speed range, with no attendant surging difficulties, thereby producing maximum static thrust for initial rising of the aircraft combined with good efficiency of the compressor in high speed level flight. The compressor vane tip speed is only approximately 800 feet per second, at the design point, which permits the rotor and vanes to be fabricated with a low resulting weight.

In the event of engine failure, the compressor vanes 65 are relied upon to act as turbine buckets impelled by the wind relative to the descending airplane, to maintain the operativeness of the pump 43 and of the flight directional controls, and to maintain gyroscopic control moments. The illustrated form of the vanes 65 has been found to operate very satisfactorily as a turbine.

Referring to Figures 5 and 8, details of a preferred form of the gyroscopic hydraulic servo portion of the propulsive system will now be described. The storage of hydraulic fluid, or light oil, is contained in a tank 32, being replenished through a return tube 33 from the gyro unit 31, and supplying fluid through a flexible tube 34 to the pump 43. The pump 43, generally of the positive displacement type, delivers fluid under relatively high pressure through a flexible tube 35 to the gyro unit 31.

The gyro unit 31 governs the differential pressure of hydraulic fluid across double acting pistons in the cylinders 15 and 16, to adjust the position of the empennage 8. The cylinders 15 and 16 are similar in construction and in connection to the gyro unit 31. The lateral hydraulic cylinder 15, concerned with control functions in a lateral plane, will be forthwith described, and it will be apparent that parts of the vertical hydraulic cylinder 16 of identical numerical designation marked "prime" bear an identical relationship to the gyro unit 31 and to the empennage 8 concerned with control functions in a vertical plane and therefore require no separate description.

The piston 40 is reciprocable within a barrel 29 secured to the structure of the cabin 1 by a universal joint 38. A piston rod 41 connects the piston 40 to a universal joint 42 attached to the forward portion of the empennage 8. Flexible control tubes 36 and 37 for hydraulic fluid communicate between the rear and front sides respectively of the piston 40 and the gyro unit 31. Accordingly as the piston 40 is moved in either direction by hydraulic pressure differential established in the gyro unit 31, the angle of the empennage is changed relative to the cabin 1, with the universal joint 17 acting as a fulcrum.

Referring now to Figures 8 and 9, the principal element of the gyro unit 31 is a gyroscope fly wheel 78 suspended with its axis of rotation always tending to remain vertical, by a ball-shaped journal 72 extending from the upper side of the wheel 78 into a spherical shell 79. Spinning of the wheel 78 at high speed is caused by jet reaction of hydraulic fluid spouting as indicated by the arrow S, from tangential nozzles 77 at the wheel's periphery. Fluid under pressure from the tube 35 is delivered through a flexible tube 86 within a spherical outer casing 93 to a drilled radial passage 75 in the shell 79. The said passage 75 delivers fluid into a circular pocket 73 at the upper end of the journal 72, and thence along a T-shaped passage 76 to the nozzles 77.

A circular groove 74 in the journal 72 coaxial with and spaced from the pocket 73 serves as a fluid pressure relief passage communicating with relief ports 89 in the shell 79, leading to the open space within the casing 93 to which the return tube 33 connects. Pressure ports 90 and 91, or radial drill holes, in the shell 79 connect through flexible tubes 87 and 88, respectively, and to the tubes 37' and 36' respectively, for actuation of the vertical cylinder 16. The ports 90 and 91 lie on opposite sides of the axis of rotation of the wheel 78, in the vertical plane of the aircraft, and confronting the surface of the journal 72 lying between the pocket 73 and the groove 74, said surface being of sufficient width to seal the ports 90 and 91 when the passage 75 is in exact vertical alignment, that is coaxial with the wheel 78. However, if the passage 75 is moved from vertical position, along the vertical plane, the ports 90 and 91 move past the edges of the journal surface and are exposed to the differential fluid pressure existing between the pocket 73 and the groove 74 effecting translation of the piston 40' to bring the attitude of the aircraft to a new position which restores the vertical position of the passage 75.

The shell 79 is adjustably positioned in a spherical bearing surface 92 extending from the casing 93, through a pin joint 80 at the top of the shell 79, by the cables 29 and 30 from the control column 21.

Accordingly, if the airplane attitude momentarily changes without the pilot manually moving the column 21, as a result of some sudden change in external forces acting upon the aircraft, the original position of the aircraft will be immediately restored by the hydraulic servo portion of the propulsive system. However, if the pilot manually moves the column 21, the attitude of the aircraft must change to a new position, which causes the position of the passage 75 to again become vertical.

The linkage connecting the cables 29 and 30 to the pin joint 80 is as follows. The cable 29 is attached to the joint 80 by a rod 81 which passes reciprocably through a bushing 82 spherically journalled in a socket 83 provided in the casing 93. The cable 30 attaches to a ball joint 85 on the end of a lever arm 84. Thus push-pull movement of the cable 29 revolves the shell 79 primarily in the vertical plane of the aircraft, while push-pull motion of the cable 30 revolves the shell 79 primarily in the lateral plane. The resulting effect upon airplane attitude being labelled over the arrows representing the movement of the cables.

Referring to Figure 9 dotted circles indicate the neutral, or non-controlling superimposed position of the pressure ports 90 and 91 confronting the journal 72. The corresponding ports 90' and 91' of the lateral system affecting the control action of the cylinder 15, are shown to be displaced at an angle of 90 degrees from the ports 90 and 91 of the vertical system.

The described directional control action of the propulsive system is particularly advantageous during the process of approach for a landing, when the aircraft is caused to lose altitude rapidly, in a vertical or nearly vertical descent, and when the normal flow past the wings is disrupted at all portions of their surfaces except possibly immediately ahead of the boundary layer air withdrawal slots. Were it not for the described automatic control action the pilot of the aircraft would have to exercise utmost skill and dexterity, subject to the existence of gust-free air conditions, to accomplish a normal landing in a restricted space.

Figure 10 illustrates details of the resilient pads 19, composed of rubberized fabric, or the like, in the central portion of which is an air cavity 101. The pad 19 is ellipsoidal or streamlined, to lessen drag, when the aircraft is in flight, as indicated by the solid lines, and is vulcanized or otherwise appropriately secured in a flared end 100 of the strut 11. When ground contact is established the pad flattens as indicated by the dotted lines 19', to increase the bearing area, thereby preventing sinking to excessive depth in soft ground.

Figure 11 illustrates the typical attitudes assumed by an aircraft using the propulsive system of the invention during a flight starting at M and ending at N, assuming that the takeoff and landing areas are of minimum size. To initiate takeoff the pilot may set the control column 21 in vertical position, revolving the handgrip 70 until the aircraft lifts off the ground and attains a desired upward acceleration.

As soon as all ground obstacles, such as buildings, hills, or the like, are cleared, the column 21 can be pushed gradually forward, causing the aircraft to rapidly gain in level flight speed, with the assumption of a horizontal position by the cabin and wings. The handgrip 70 will then generally be turned back to a lower power to increase range of the aircraft, and to improve economy of operation.

The approach to a selected landing area generally can be made at a steep angle, 45 degrees for example, caused by leaving the power setting of the handgrip 70 at the cruising value, and gradually pulling the column 21 back, to raise the nose of the aircraft, which then "mushes" down toward the landing spot. When the aircraft is nearly directly over the landing spot, the column 21 is pulled back more, while the power setting of the handgrip is gradually increased to retard the downward motion of the aircraft, permitting the aircraft to settle gently on the ground with the cabin and wings nearly vertical.

In the event of a strong side wind on landing, the pilot will find it necessary to bias the setting of the control column in the windward direction in order to remain nearly above the landing spot while descending. Due to the dihedral angle of the wings, the aircraft will then gradually revolve until the belly of the aircraft is facing the wind, which facilitates guidance to selected landing spot.

In the foregoing description propulsive means for vertical rising aircraft have been set forth in which the essential elements for attainment of high performance, flexibility, and adequate safety have been incorporated in a simplified mechanical form appropriate for use by individuals and families. However, the principles of the invention are applicable to aircraft and motive vehicles of other types, and may in fact assume many different forms both as to details of construction and as to use. Therefore, the foregoing description and figures are schematically illustrative of general principles embraced by the subject invention, in a manner limited only by a just interpretation of the following claims.

I claim:

1. An aircraft propulsion system comprising a body to be propelled, a propulsive power plant of the air consuming type, an empennage carrying the powerplant and movably secured to the aft end of the body and embracing the same with clearance to leave an air inlet supplying air to said power plant from the boundary layer of air surrounding said body, and means for regulating the position of said empennage and power plant relative to said body to increase the boundary layer air reception into the power plant at one side of the body and to decrease such reception at the opposite side of the body and to determine the direction of flight.

2. An aircraft propulsion system comprising a body to be propelled, a ducted compressor rotor for propulsion of said body by jet reaction, said rotor entraining air flowing past said body and devolving during said entrainment, an engine connected to said rotor in driving relationship therewith, the axis of said rotor being movable with respect to said body, an hydraulic servo system controlling the movement of said axis with respect to said body to determine the direction of flight, an overrunning clutch between said engine and said rotor to disconnect said engine from said rotor in the event of engine failure, a hydraulic pump driven by said rotor, and said servo system being furnished fluid under pressure from said pump.

3. An aircraft propulsion system comprising a fuselage to be propelled, a ducted compressor rotor for propulsion of said fuselage by jet reaction, an air inlet for said rotor facing in a forward direction and an air outlet for said rotor facing in a rearward direction, said rotor having backswept impeller vanes, an engine, an overrunning clutch connecting said engine to said rotor in driving relationship therewith, a servo-mechanism for varying the angle of efflux of air from said outlet with respect to said fuselage affecting direction of flight, and power supply means for said servo-mechanism driven by said compressor rotor alternatively active as an air turbine in the event of engine failure.

4. An aircraft propulsive system for vertical rising aircraft comprising an ellipsoidal fuselage having laterally extending wings, a universal joint at the downstream end of said fuselage, a ducted air compressor secured to said universal joint having a generally tubular outer housing spaced from the downstream end of said fuselage to form an annular air inlet for said compressor, power means to drive said compressor encompassed by said housing, and means to regulate the angle of said housing relative to said fuselage.

5. An aircraft propulsion system for vertical rising aircraft comprising an ellipsoidal fuselage having laterally extending wings, a universal joint at the downstream end of said fuselage, a ducted air compressor secured to said universal joint having a generally tubular outer housing spaced from the downstream end of said fuselage to form an annular air inlet for said compressor, power means to drive said compressor, means to regulate the angle of said housing relative to said fuselage, boundary layer air withdrawal openings in the surfaces of said wings, and ducts connecting said openings to said compressor's inlet.

6. An aircraft comprising a fuselage body, an air consuming reactive propulsion power plant, an empennage carrying the power plant and movably secured to the aft end of the body to partially surround the same with clearance and thereby leave an air inlet passage for the power plant, and means for moving the empennage relative to the body to increase the air reception into the power plant at one side of the body and to decrease such reception at the opposite side of the body to exert directional control on the aircraft.

7. An aircraft comprising an ellipsoidal streamlined body, wings extending from the body, a tubular empennage of forwardly increasing diameter arranged at the aft end of the body so that the aft portion of the body is received in the forward end of the empennage with clearance to leave an air-receiving passage, joint means connecting the empennage with the body for movement about an axis adjacent the plane occupied by the forward end of the empennage, a propulsive nozzle at the aft end of the empennage, the empennage having a duct receiving air from said air-receiving passage and discharging the same through the nozzle, a compressor operating in said duct to move said air therethrough for discharge from the nozzle as a propulsive jet, and turbo power plant means in the empennage driving the compressor and including rearwardly directed gas exhausting nozzle means for assisting in propelling the aircraft.

8. An aircraft comprising an ellipsoidal streamlined body, wings projecting from the body, a hollow empennage of forwardly increasing diameter arranged so that the aft portion of the ellipsoidal body is received in the forward end of the empennage with clearance to leave an air-receiving passage, the empennage having a duct, the forward end of the duct being in communication with said passage to receive air therefrom, joint means connecting the empennage with the body for movement about an axis adjacent the plane occupied by the forward end of the empennage, means on the body connected with the empennage for moving the empennage about said axis, a propulsive nozzle at the aft end of the empennage duct, propulsion means in the empennage for moving air through said duct for discharge from said nozzle as a propulsive jet, and a power plant carried by the empennage driving the propulsion means and including a rearwardly directed gas outlet for assisting said jet in propelling the aircraft.

NATHAN C. PRICE.

References Cited in the file of this patent

UNITED STATES PATENTS

| Number | Name | Date |
|---|---|---|
| D. 136,277 | Dailey | Aug. 31, 1943 |
| 1,692,397 | Wagner | Nov. 20, 1928 |
| 2,022,476 | Myers | Nov. 26, 1935 |
| 2,382,460 | Young | Aug. 14, 1945 |
| 2,387,762 | Leonard | Oct. 30, 1945 |
| 2,396,568 | Goddard | Mar. 12, 1946 |
| 2,420,323 | Meyer | May 13, 1947 |
| 2,434,187 | Wilson | June 6, 1948 |
| 2,470,348 | Haight | May 17, 1949 |
| 2,499,401 | Madden | Mar. 7, 1950 |
| 2,510,561 | De Laval | June 6, 1950 |